United States Patent [19]
Cohen, Jr.

[11] Patent Number: 5,893,547
[45] Date of Patent: Apr. 13, 1999

[54] STAND FOR CHRISTMAS TREE OR THE LIKE

[76] Inventor: Ansley Davis Cohen, Jr., 687 Blue Heron Run, Mt. Pleasant, S.C. 29464

[21] Appl. No.: 09/025,386

[22] Filed: Feb. 18, 1998

[51] Int. Cl.$^6$ ................................................. F16M 13/00
[52] U.S. Cl. .......................................... 248/521; 248/523
[58] Field of Search ...................... 248/521, 523, 248/524, 349.1

[56] References Cited

U.S. PATENT DOCUMENTS

| | | | |
|---|---|---|---|
| 1,421,398 | 7/1922 | Burchess | 248/523 |
| 3,648,957 | 3/1972 | Bencriscutto | 248/521 X |
| 3,784,136 | 1/1974 | Lopez | 248/44 |
| 4,119,290 | 10/1978 | Gies | 248/523 |
| 4,750,702 | 6/1988 | Neil et al. | 248/523 |
| 4,825,586 | 5/1989 | Coppedge | 47/40.5 |
| 4,901,971 | 2/1990 | Connelly | 248/523 |
| 5,137,246 | 8/1992 | Idso | 248/523 |
| 5,149,043 | 9/1992 | Groundman | 248/349.1 |
| 5,160,110 | 11/1992 | Praegitzer | 248/523 |
| 5,375,807 | 12/1994 | Claas | 248/514 |
| 5,490,350 | 2/1996 | Eisenschenk et al. | 47/40.5 |
| 5,492,301 | 2/1996 | Hauser | 248/516 |
| 5,497,972 | 3/1996 | Sofy | 248/529 |
| 5,580,026 | 12/1996 | Newcomer | 248/523 |
| 5,685,518 | 11/1997 | Fox et al. | 248/523 |
| 5,782,453 | 7/1998 | Tuzza et al. | 248/523 |

OTHER PUBLICATIONS

Fall, 1997 Catalog, Hammacher Schlemmer, 9180 LeSaint Drive, Fairfield, OH, pp. 5, 29, 31, 49.
Fall, 1997 Catalog, Solutions, POB 6878, Portland, OR, pp. 58, 59.
Autumn, 1997 Catalog, Frontgate, 2800 Henkle Drive, Lebanon, OH, p. 79.

*Primary Examiner*—Ramon O. Ramirez
*Attorney, Agent, or Firm*—Harleston Law Firm; Kathleen M. Harleston

[57] ABSTRACT

A two-part stand assembly, preferably for the indoor display of natural Christmas trees or the like, is described. The upper part of the stand, which holds the tree, rotates clockwise and counterclockwise around the stationary lower part of the stand. The stand assembly comprises:

(a) a removable upper pot portion comprising a bucket of sufficient dimension to accommodate the Christmas tree or other pole-like member, and releaseable fastening means for holding the Christmas tree or other pole-like member in an upright position;

(b) a rotatable ring member comprising a channel and one or more concentric rings, the channel holding a plurality of ball bearings; and (c) a lower base portion comprising a central well for surrounding and receiving a portion of the bucket of the upper pot portion, and a flat base capable of supporting the stand assembly and Christmas tree on a horizontal surface; and wherein the removeable upper pot portion fits over the rotatable ring member such that the upper pot portion is capable of rotating while the lower base portion remains stationary.

9 Claims, 4 Drawing Sheets

STAND FOR CHRISTMAS TREE OR THE LIKE

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Technical Field

The present invention is a two-part stand for holding a Christmas tree or the like in an upright position, more particularly a hand-operated, rotatable stand assembly with a removeable upper portion.

2. Background Information

One mixed blessing of the Christmas season is the Christmas tree. Once decorated, it is splendid to behold. Unfortunately, procuring the tree, setting it up and decorating it, and later reversing the process, can be difficult.

Once a natural tree is purchased at a tree lot, or, as happens less frequently, is cut down by the individual household, it must be hauled home, fitted to a Christmas tree stand, and brought indoors. The tree is most often placed in a corner or against a wall in the living room or den. If, as frequently happens, the tree is found to have a crooked side or a hole in the branches, the whole tree must be lifted, turned, and set down again. Many particular families or individuals will repeat this step several times before a pleasing side is settled upon. It can be difficult to fit a Christmas tree into many tree stands which are currently available and then to decorate it. Once the tree is in place, some of today's tree stands are awkward to carry through doorways, and/or are not very stable, and the majority do not rotate. It can also be difficult to water the tree; the tree-owner often must crawl under the tree without spilling her pitcher of water, and pour the water into the stand without overfilling. Once the tree is up, the tree-owner must repeatedly squeeze behind the tree, or have a partner on the other side, to place the Christmas tree lights and then the decorative garlands around the tree, beginning at the top. Individual ornaments, which are often fragile, are ordinarily placed on the tree next. At all points, particularly when decorating the top of the tree, the tree decorators risk upsetting the tree, breaking the Christmas ornaments, and possibly injuring themselves or bystanders.

The present invention is a rotatable stand assembly for Christmas trees and the like, which has a wide, stable base so that the tree is not easily upset, and a removable upper pot portion. By "rotatable" is meant "capable of being rotated." The present tree stand assembly comprises a removable upper pot portion which preferably has a flared neck or projecting spout at the top so that the Christmas tree can be watered easily and with less spillage. The upper pot portion can easily be removed from the stand assembly and carried to the tree. The removable upper pot portion can, for example, be fitted on the tree trunk outside the house (such as in the driveway) for easier clean-up, or placed on the tree at the Christmas tree sales lot where assistance can be sought from the sales personnel.

Importantly, the present Christmas tree stand assembly also comprises a rotatable ring member which allows the upper pot portion of the stand to be rotated 360 degrees around the base portion, which remains stationary. Thus, the Christmas tree in the stand can be rotated by hand in a clockwise or counterclockwise direction. The best side of the tree for presentation can thus be selected easily without physically picking up the tree and the stand, turning it, putting it down, standing back and observing, and then frequently repeating the process. This is not an easy task, particularly with larger trees. With the present stand, the Christmas tree can, for example, be rotated clockwise before Christmas for attaching strings of Christmas tree lights, garlands, and ornaments, and counterclockwise for easier removal of the lights, garlands, and ornaments after Christmas. With the present stand, it is no longer necessary to have a partner help decorate the tree, or to leave room behind the tree for the decorator to squeeze through while decorating the tree. It is no longer necessary to keep moving the Christmas tree ornaments and other supplies around so that they can be reached from different decorating positions. The person decorating the tree can stand in one position as the tree revolves. In-other words, the tree goes around so that he doesn't have to. This stand reduces physical strain on the tree-owner and thus makes Christmas more enjoyable.

BRIEF SUMMARY OF THE INVENTION

The present invention is a two-part stand assembly, preferably for the indoor display of natural Christmas trees or the like. The upper part of the stand, which holds the tree, is capable of being rotated around the stationary lower part of the stand. The stand assembly comprises:

(a) a removable upper pot portion comprising a bucket of sufficient dimension to accommodate the Christmas tree or other pole-like member, and releaseable fastening means for holding the Christmas tree or other pole-like member in an upright position;

(b) a rotatable ring member comprising a channel and one or more concentric rings, the channel holding a plurality of ball bearings; and (c) a lower base portion comprising a central well for surrounding and receiving a portion of the bucket of the upper pot portion, and a flat base capable of supporting the stand assembly and Christmas tree on a horizontal surface; and wherein the removeable upper pot portion fits over the rotatable ring member such that the upper pot portion is capable of rotating while the lower base portion remains stationary.

BRIEF DESCRIPTION OF THE SEVERAL VIEWS OF THE DRAWINGS

A more complete understanding of the invention and its advantages will be apparent from the following detailed description taken in conjunction with the accompanying drawings, wherein examples of the invention are shown, and wherein.

DETAILED DESCRIPTION OF THE INVENTION

Figure 1:
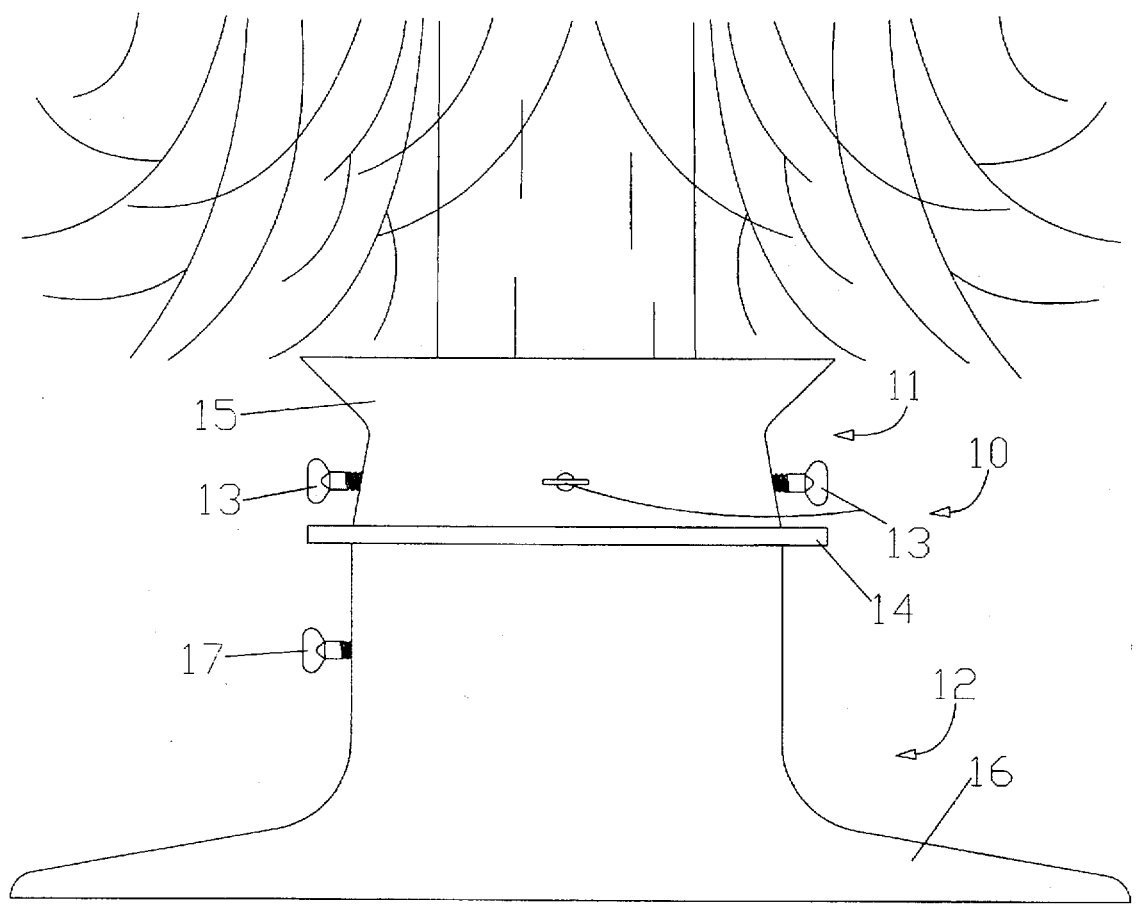
FIG. 1 shows a side, elevational view of a Christmas tree stand assembly according to the present invention.

In the following description, like reference characters designate like or corresponding parts throughout the several views. Also, in the following description, it is to be understood that such terms as "front," "back," "top," "bottom," "within," and the like are words of convenience and are not to be construed as limiting terms. Referring in more detail to the drawings, the invention will now be described.

Referring to FIG. 1, a Christmas tree stand assembly 10 according to the present invention has two portions: an upper pot portion 11, which the tree fits into, and a lower base portion 12. The upper pot portion 11 comprises one or more, preferably four, removable pot screws 13 which are placed at even intervals around the neck of the upper pot portion 11. These long pot screws 13 project through holes in the upper pot portion 11 toward the center space of the upper pot portion 11. When a Christmas tree, preferably a natural tree, is placed in the upper pot portion 11, the pot screws 13 can be tightened against the erect tree trunk. This fastens the tree in place in the pot. The present stand can be used for erecting, decorating, viewing and dissembling a Christmas tree or other pole-like member, most preferably for holding a natural (not artificial) Christmas tree.

The user has the option of bringing the tree to the stand, or removing the upper pot portion 11 from the stand assembly 10 and taking it to the Christmas tree. The upper pot portion 11 can, for example, be brought outside to the tree and placed on the tree before bringing the tree indoors, which allows for less mess in the home. Or an older person, for example, can remove the upper pot portion 11 and take it with him to the Christmas tree sales lot where he can request assistance in cutting off the lower branches and bottom of the trunk and fitting the tree trunk into the pot portion 11. At home, the upper pot portion 11, which is holding the tree, can be placed into the lower base portion 12. The tree is then ready to water and decorate. There is preferably no foot pedal or any other type of release mechanism in the lower base portion 12; the upper pot portion 11 is simply lifted out of or into the lower base portion 12 and the weight of the tree keeps the upper part in place in the lower part.

The upper pot portion 11 also has an outer lip 14 around its circumference. This outer lip 14 is located below the pot screws 13 on the neck of the pot portion 11 and fits closely over the top of the lower base portion 12.

As shown in FIG. 1, the upper pot portion 11 preferably has a flared watering lip 15 at the top which facilitates the periodic addition of water to the bucket with less spillage than would be the case with a close-fitting neck. It is less difficult to overfill a pot with this flared watering lip because the water level is more clearly visible once it reaches the flared area. Alternatively, the upper pot portion 11 can comprise a spout (not shown) which projects from one area of the neck of the pot portion. Water could be added to the tree via the projecting spout.

Also shown in FIG. 1 is the base 16 of the lower base portion 12 of the stand assembly 10. The flat, round base 16 is wide and stable so that the Christmas tree is not easily toppled by, for example, a pet or toddler. On the bottom of the base is a rubber or similar type of thin cushion to protect wooden or ceramic tile floors from the metal part of the base. The lower base portion 12 also has one or more, preferably one, base screw 17, which is tightened by the user to lock the upper pot portion 11 in place or loosened to allow the upper pot portion 11 to revolve, as desired.

Figure 2:
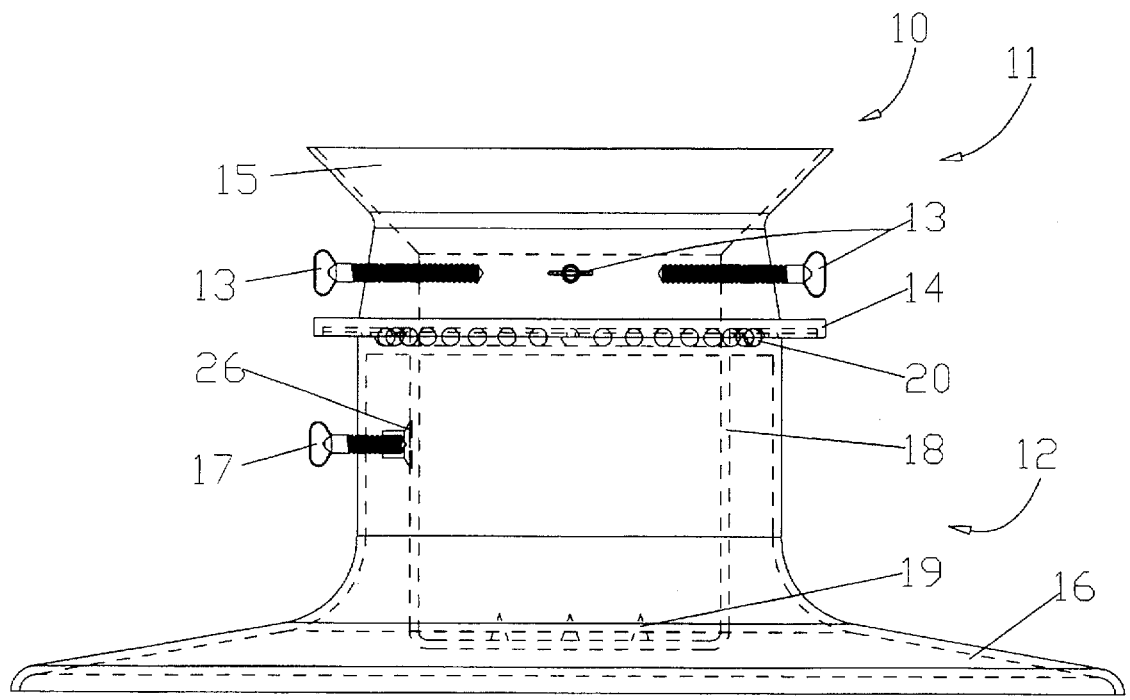
FIG. 2 is a side view of the tree stand assembly according to FIG. 1, showing its inside construction.

FIG. 2 shows the inside construction of the tree stand assembly 10, which would not be apparent to an observer looking at the assembled stand. The removable upper pot portion 11 comprises an inner bucket 18 and the outer lip 14. The inner bucket 18 is of sufficient dimension to accommodate the bottom trunk of the desired Christmas tree, as well as several days' supply of water for the tree. Most Christmas trees range in size from four to ten feet (1.22 to 3.05 meters) in height, which can be accommodated by the present device. Many people prefer an evergreen tree which is between five and eight feet (1.52 and 2.44 meters) in height. The present stand assembly is for releasably holding various sizes of Christmas trees or other pole-like members in upright positions. It can optionally, though less preferably, be manufactured in different sizes to accommodate various tree sizes. In this preferred embodiment, the inner bucket 18 has one or more, preferably four, spears 19 which project upward from the bottom of the inner bucket 18. These spears 19 help to hold the bottom of the Christmas tree in place once the tree has been placed in the upper pot portion 11. The inner bucket 18 is adapted to be partially filled with water. Water is preferably added periodically to the inner bucket 18 to keep the Christmas tree fresh. The lower base portion 12 comprises a rotatable ring member 20.

Figure 3:
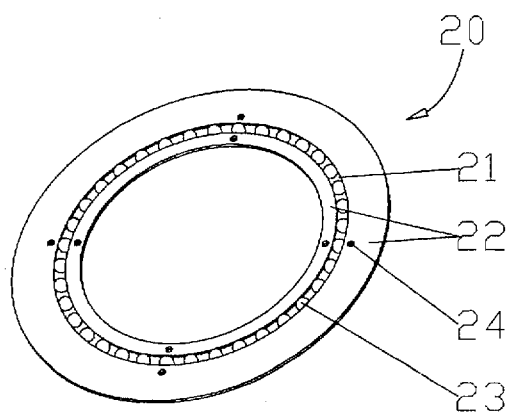
FIG. 3 is a perspective view of a rotatable ring member of the tree stand assembly according to FIG. 2.

Referring to FIG. 3, the rotatable ring member 20 comprises a channel 21 between two concentric rings 22. The channel 21 holds a series of ball bearings 23 which are side by side in the channel 21. The ball bearings 23 should be durable, lightweight, and rust-proof The rotatable ring member 20 is fastened to the top of the lower base portion 12 during manufacture of the stand assembly 10 by means of removable bolts or screws placed through equidistant ring holes 24 along the edges of the concentric rings. The rotatable ring member 20 screws down into the top of the lower base portion 12. The rotatable ring member 20 can be replaced later if necessary by unscrewing it from the lower base portion 12 and screwing in a new rotatable ring member 20. The part of the lower base portion 12 around the outside of the rotatable ring member 20 flares into a base flange 25, which is formed to fit into the outer lip 14 of the upper pot portion 11.

Figure 4:
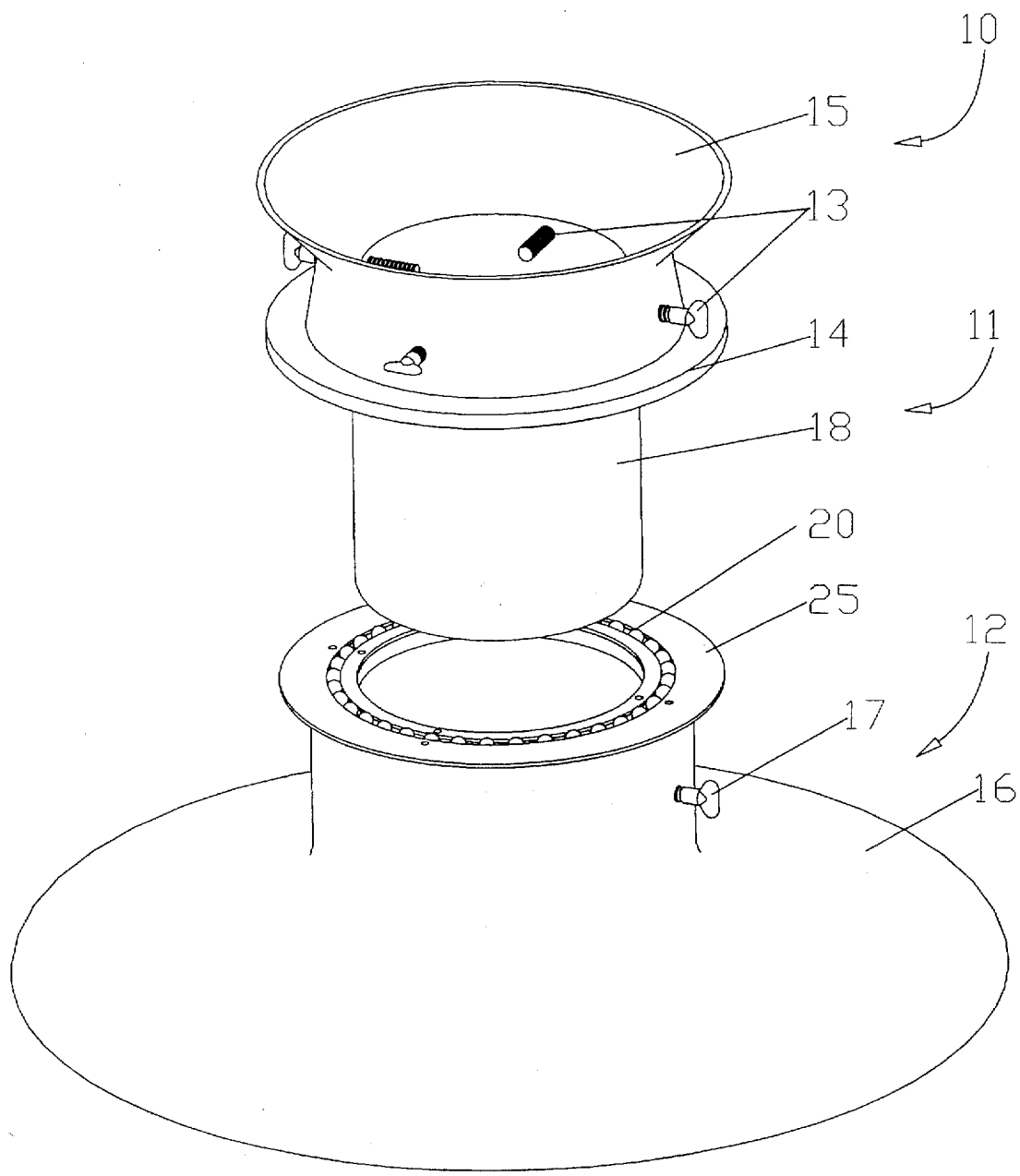
FIG. 4 is a perspective view of the detachable upper portion and the lower base portion of the tree stand assembly according to FIG. 1.

As seen in FIGS. 2 and 4, the upper pot portion 11 fits closely into the lower base portion 12. The inner bucket 18 of the upper pot portion 11 fits down through the center of the rotatable ring member 20 into the hollow center of the lower base portion 12. The outer lip 14, which hangs from the outside circumference of the upper pot portion 11, fits down over the top of the base flange 25, which surrounds the rotatable ring member 20. The result resembles a Lazy Susan. The outer lip 14 glides over the ball bearings 23 in the rotatable ring member 20. The upper pot portion 11 can thus be rotated as it sits on the stationary lower base portion 12. The person decorating the Christmas tree can use this helpful feature to slowly turn the tree as she decorates it. This assists in, for example, hanging the Christmas tree lights, the garlands, and the Christmas decorations.

The tree should not be plugged in, though, while it is being rotated because the electric light cord may become tangled around the tree and stand. No electric current or motorized gadgets are needed to turn this simple mechanism, which is propelled with a motion from the user's hand. The present stand assembly is hand-operated and does not comprise an electric motor or other mechanized means of rotation. It is not meant to be a device for constantly rotating a decorated tree for display purposes.

Preferably:

1) the upper pot portion 11 further comprises an outer lip 14 and the lower base portion 12 further comprises a flange 25, and the outer lip 14 fits closely over the flange 25 such that the upper pot portion 11 is capable of rotating clockwise or counterclockwise over the rotatable ring member 20 while the lower base portion 12 remains stationary. The rotatable ring member 20 is removeably affixed to the lower base portion 12;

2) the rotatable ring member 20 is removeably affixed to the lower base portion;

3) the upper pot portion 11 further comprises a flared watering lip 15;

4) the bucket 18 is adapted to hold water and fits through the center of the rotatable ring member 20 into the central well of the lower base portion 12;

5) the releaseable fastening means are three or more screws 13 which each project toward the tree or pole through equi-distant holes in the neck of the upper pot portion, and which are capable of uniformly contacting and holding the tree or pole in an upright position for several weeks;

6) the stand assembly 10 is for holding a natural Christmas tree which is between about four and ten feet, or 1.22 and 3.05 meters, in height;

7) the lower base portion 12 further comprises a screw 17 which projects through a hole in the lower base portion toward the center well, and is capable of contacting the bucket 18 when the upper pot portion 11 is in place in the stand assembly 10 and temporarily preventing the upper pot portion 11 from being rotated;

8) the rotatable ring member 20 consists essentially of a circular channel 21 between two concentric rings 22, the channel 21 comprising a plurality of ball bearings 23 which are set single file in the channel 21.

Figure 5:
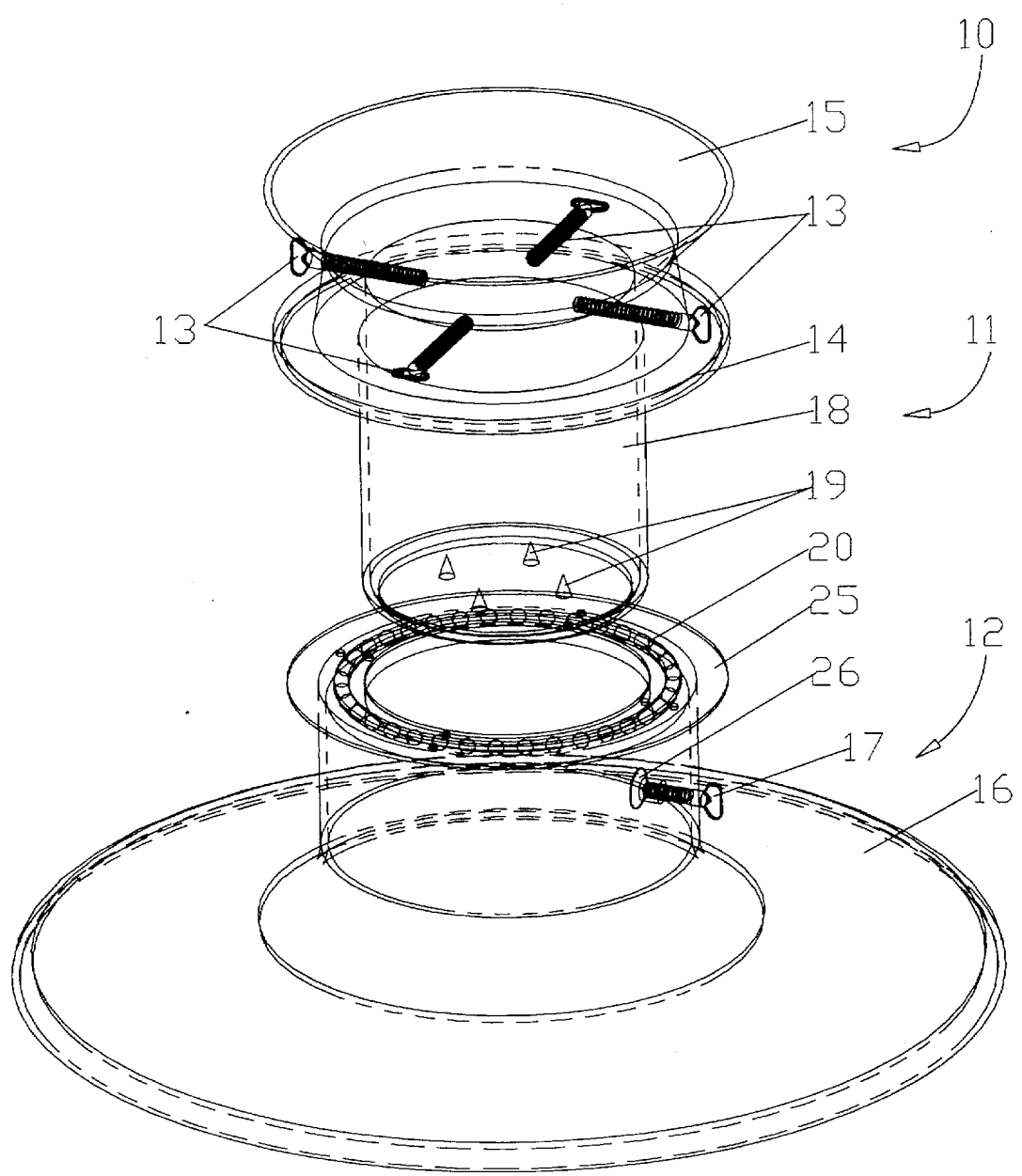
FIG. 5 shows a perspective view of the tree stand assembly according to FIG. 1.

Once the tree is decorated and the most aesthetically pleasing side of the tree is selected for presentation toward the middle of the room or the window, the Christmas tree can be fixed in place. This is accomplished by tightening the single base screw 17 which extends through a hole in the lower base portion 12. As is shown in FIGS. 2 and 5, the single base screw 17 comprises a small screw pad 26, which is fixed at the end of the base screw 17 for a relatively firm fit against the inner bucket 18 of the upper pot portion 11. The screw pad 26 is typically made of a material which is durable for repeated uses, yet will not damage (by scratching, for example) the inner bucket 18. The screw pad 26 is preferably a ⅛ to ½ inch (3.18 to 12.7 mm.) square, 1/16 to ⅛ inch (1.59 to 3.18 mm.) thick, rubber or plastic patch. The screw pad 26 is preferably slightly conformed to the shape of the inner bucket 18. When the base screw 17 is unscrewed, as shown in FIG. 5, the screw pad 26 should not touch the inner bucket 18 so as not to impede rotation of the upper pot portion 11.

To fix the Christmas tree in place, the user tightens the base screw 17. Inside the lower base portion 12, this causes the screw pad 26 at the end of the base screw 17 to meet the outer side of the inner bucket 18, as shown in FIG. 2. This prevents the inner bucket 18 from turning further. Since the inner bucket 18 is fixed to the rest of the upper pot portion 11, further rotation is halted.

When the user decides to dissemble the decorated tree, she unscrews the base screw 17, which pulls the screw pad 26 away from the side of the inner bucket 18 and thereby frees the upper pot portion 11. To turn the Christmas tree, the user pushes or pulls a lower branch of the tree in the desired direction. Alternatively, the upper pot portion 11, which is generally harder to reach than the tree branches, can be pushed in the desired direction of motion. When the rotatable ring member 20 contains high quality ball bearings 23, not much of a push or pull is required to cause the tree to rotate. The user can remain in one place with the ornament storage boxes in position to receive the ornaments as they are removed from the tree. After removing the ornaments from one segment of the tree, the user pushes the tree slightly to bring another decorated segment of the tree in front of her. She removes the decorations from that segment, and repeats the steps. After the ornaments, which are often fragile, are removed, the garlands or other strands can be removed by rotating the tree counterclockwise. The tree lights are ordinarily removed last, also by rotating the tree counterclockwise. The tree and upper pot portion can then be lifted out of the lower base portion and taken outside. At the refuse disposal site, the upper pot portion can be removed.

From the foregoing it can be realized that the described device of the present invention may be easily and conveniently utilized. The present invention allows erecting, decorating and dissembling the Christmas tree to take less physical energy, which makes the Christmas season more enjoyable. This invention is also of assistance to the infirm or physically limited person, who might not otherwise want to go through the trouble of having a Christmas tree.

While preferred embodiments of the invention have been described using specific terms, this description is for illustrative purposes only. It will be apparent to those of ordinary skill in the art that various modifications may be made without departing from the spirit or scope of the invention, and that such modifications are intended to be within the scope of the present invention.

What is claimed is:

1. A rotatable stand assembly for holding a Christmas tree or other pole-like member in an upright position, the stand assembly comprising:

(a) a removable upper pot portion comprising a bucket of sufficient dimension to accommodate the Christmas tree or other pole-like member, and releasable fastening means for holding the Christmas tree or other pole-like member in an upright position;

(b) a rotatable ring member comprising a channel and one or more concentric tings, the channel holding a plurality of ball bearings; and (c) a lower base portion comprising a central well for surrounding and receiving a portion of the bucket of the upper pot portion, and a flat base capable of supporting the stand assembly and Christmas tree on a horizontal surface; and wherein the removable upper pot portion fits over the rotatable ring member such that the upper pot portion is capable of rotating while the lower base portion remains stationary; and wherein the upper pot portion further comprises an outer lip and the lower base portion further comprises a flange, and wherein the outer lip fits closely over the flange such that the upper pot portion is capable of rotating clockwise or counterclockwise over the rotatable ring member while the lower base portion remains stationary.

2. A rotatable stand assembly according to claim 1, wherein the rotatable ring member is removeably affixed to the lower base portion.

3. A rotatable stand assembly according to claim 2, wherein the upper pot portion further comprises a flared watering lip.

4. A rotatable stand assembly according to claim 3, wherein the bucket is adapted to hold water and fits through the center of the rotatable ring member into the central well of the lower base portion.

5. A rotatable stand assembly according to claim 4, wherein the releaseable fastening means are three or more screws which each project toward the tree or pole through equidistant holes in the neck of the upper pot portion, and which are capable of uniformly contacting and holding the tree or pole in an upright position for several weeks.

6. A rotatable stand assembly according to claim 5, wherein the stand assembly is for holding a natural Christmas tree which is between about four and ten feet, or 1.22 and 3.05 meters, in height.

7. A rotatable stand assembly according to claim 6, wherein the lower base portion further comprises a screw which projects through a hole in the lower base portion toward the center well, and is capable of contacting the bucket when the upper pot portion is in place in the stand assembly and temporarily preventing the upper pot portion from being rotated.

8. A rotatable stand assembly according to claim 7, wherein the stand assembly is hand-operated and does not comprise an electric motor or other mechanized means of rotation.

9. A rotatable stand assembly according to claim 8, wherein the rotatable ring member consists essentially of a circular channel between two concentric rings, the channel comprising a plurality of ball bearings which are set single file in the channel.

* * * * *